United States Patent
Gouillart et al.

(10) Patent No.: US 7,422,252 B2
(45) Date of Patent: Sep. 9, 2008

(54) BUMPER FOR A MOTOR VEHICLE

(75) Inventors: Philippe Gouillart, Delbrück (DE); Christian Handing, Langenberg (DE); Achim Kröning, Paderborn (DE); Dariusz Straznikiewicz, Paderborn (DE); Hui Wang, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 11/682,636

(22) Filed: Mar. 6, 2007

(65) Prior Publication Data
US 2007/0210590 A1 Sep. 13, 2007

(30) Foreign Application Priority Data
Mar. 8, 2006 (DE) .................. 10 2006 011 055

(51) Int. Cl.
*B60R 19/02* (2006.01)
(52) U.S. Cl. ..................................... 293/102
(58) Field of Classification Search .............. 293/102, 293/132
See application file for complete search history.

(56) References Cited

U.S. PATENT DOCUMENTS

| 4,030,735 | A | * | 6/1977 | Jacob et al. ............... 293/122 |
|---|---|---|---|---|
| 4,361,352 | A | * | 11/1982 | Wakamatsu ................ 293/120 |
| 4,474,395 | A | * | 10/1984 | Harloff et al. .............. 293/120 |
| 4,482,180 | A | * | 11/1984 | Huber et al. ............... 293/120 |
| 5,154,462 | A | * | 10/1992 | Carpenter .................. 293/120 |
| 5,202,172 | A | * | 4/1993 | Graf ......................... 428/100 |
| 5,290,078 | A | * | 3/1994 | Bayer et al. ................ 293/120 |
| 5,407,239 | A | * | 4/1995 | Arai et al. .................. 293/146 |
| 6,695,366 | B2 | * | 2/2004 | Cherry ...................... 293/120 |
| 6,764,119 | B2 | * | 7/2004 | Bladow et al. ............. 293/155 |

FOREIGN PATENT DOCUMENTS

DE  2 164 119  5/1973

* cited by examiner

Primary Examiner—H Gutman
(74) *Attorney, Agent, or Firm*—Henry M. Feiereisen

(57) ABSTRACT

A bumper for the front or rear section of a motor vehicle includes a cross member having a shell of U shaped cross section so as to define two legs interconnected by a crosspiece, and a mounting plate joined to the shell. The mounting plate has a U shaped configuration to define a longitudinal wall and two flanged portions which extend from the wall in a direction of the shell so that passageways are formed between the legs of the shell and the flanged portions of the mounting plate. A buffer is disposed anteriorly of the cross member and constructed for a snap fit to the mounting plate, with the buffer having spring legs for acceptance in the passageways.

5 Claims, 1 Drawing Sheet

BUMPER FOR A MOTOR VEHICLE

CROSS-REFERENCES TO RELATED APPLICATIONS

This application claims the priority of German Patent Application, Serial No. 10 2006 011 055.2, filed Mar. 8, 2006, pursuant to 35 U.S.C. 119(a)-(d), the content of which is incorporated herein by reference in its entirety as if fully set forth herein.

BACKGROUND OF THE INVENTION

The present invention relates, in general, to a bumper for a motor vehicle.

Nothing in the following discussion of the state of the art is to be construed as an admission of prior art.

Bumpers are parts of a vehicle body and typically integrated in the front and rear sections that are lined by a covering. The purpose of bumpers is the prevention or at least minimization of any damage to the vehicle structure and the protection of an occupant of the vehicle in the event of an impact at slow speed. In order to better its capability, buffers are provided and arranged anteriorly of the cross member of the bumper. The buffer is normally made of elastic material, typically plastic. In this way, the bumper receives sufficient elasticity to effectively absorb impact energy in the event of a collision with a person so that risk of injury to the person can be reduced. The buffer is secured to the cross member of the bumper, using special connectors, e.g. clips. This is costly as well as labor-intensive.

German Offenlegungsschrift DE 2 164 119, published Jul. 5, 1973, discloses a bumper for a motor vehicle, having a girder which can be subjected to bending stress and is made of two profiles which are welded together. Arranged anteriorly of the girder is a profiled U shaped member having legs which are lined with elastic material and supported in grooved areas of the girder.

U.S. Pat. No. 4,474,395, issued Oct. 2, 1984, describes a bumper for a motor vehicle, having a girder which can be subjected to bending stress and is secured to the vehicle body. Disposed anteriorly of the girder is a foam energy absorber. This construction is masked by an outer covering which is attached to the girder.

It would be desirable and advantageous to provide an improved bumper which obviates prior art shortcomings and which is simple in structure and inexpensive and yet reliable in operation.

SUMMARY OF THE INVENTION

According to one aspect of the present invention, a bumper for the front or rear section of a motor vehicle includes a cross member having a shell of U shaped cross section so as to define two legs interconnected by a crosspiece, and a mounting plate joined to the shell and having a U shaped configuration to define a longitudinal wall and two flanged portions extending from the wall in a direction of the shell so that passageways are formed between the legs of the shell and the flanged portions of the mounting plate, and a buffer disposed anteriorly of the cross member and constructed for a snap fit to the mounting plate, with the buffer having spring legs for acceptance in the passageways.

The present invention resolves prior art shortcomings by forming the cross member from a shell and a mounting plate which at least partially closes the shell, and by providing a buffer which can be secured to the mounting plate via a snap fit. The connection between the buffer and the mounting plate of the cross member can thus be realized in the absence of any additional connectors. This reduces costs and simplifies assembly. Currently preferred is the provision of a buffer as a separate component which extends between the outer covering, normally plastic, and the cross member at least along a major length of the cross member. Of course, the buffer may also be constructed to constitute the outer covering of the bumper.

According to another feature of the present invention, the cross member may be made of steel sheet whereas the buffer may be made of plastic. The snap fit between the mounting plate of the cross member and the buffer can easily be implemented by exploiting the elasticity of the buffer material. As a result, locking elements can be formed on the buffer, e.g. in the form of spheres, bulbs, beads or, in particular, hooks or catches to engage undercuts on the mounting plate to thereby realize this type of form-fitting connection. Suitably, the snap fit is constructed to allow disengagement or release thereof. Currently preferred is the implementation of the snap fit by forming locking elements on the buffer for engagement in undercuts of the mounting plate, when the bumper is assembled.

According to another feature of the present invention, the undercuts may be formed at latch openings of the mounting plate. The latch openings may be provided in the flanged portions of the mounting plate.

According to another feature of the present invention, the legs of the shell have ends which can be extended respectively by flanges, with the mounting plate being joined to the flanges of the shell, The mounting plate can be configured such that the wall thereof is sized to extend on both sides beyond the crosspiece of the shell in vertical direction. As a result, passageways between the legs of the shell and the flanged portions of the mounting plate are created for acceptance of the spring legs of the buffer. The locking elements are hereby disposed at the ends of the spring legs for engaging the undercuts on the mounting plate.

According to another feature of the present invention, the flanges of the legs may be configured to point inwardly toward one another.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
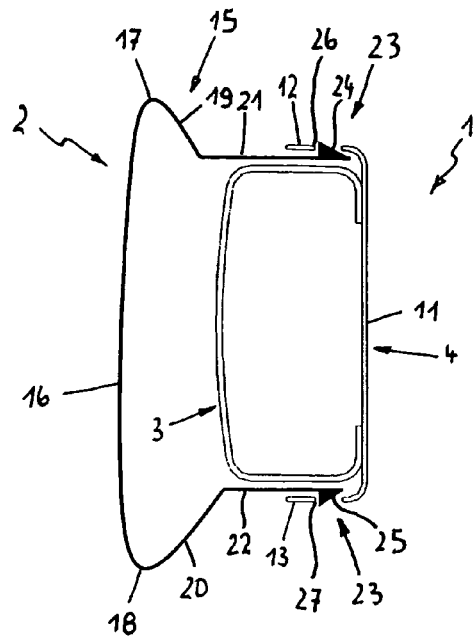
FIG. 1 is a vertical sectional view of a bumper according to the present invention.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a vertical sectional view of a bumper according to the present invention which is placed across a front or rear area of a motor vehicle between a visible plastic covering (not shown) and the vehicle body (not shown). The bumper includes a cross member 1 which normally is mounted across the side rails of the vehicle body via crash boxes. The cross member 1 is composed of a shell 3 of U shaped cross section and a mounting plate 4. The shell 3 has a crosspiece 5 and two legs 6, 7 which extend out from the crosspiece 5 to define the U shape. Flanges 8, 9 are connected to the shell-distal ends of the legs 6, 7 and point inwardly in the non-limiting example of FIG. 2. The mounting plate 4 is joined to the flanges 8, 9 of the shell 3 by welding. Oblong holes 10 in the mounting plate 4 can hereby be used for slot welding, or the mounting plate 4 may also be connected to the flanges 8, 9 of the shell 3 by spot welding.

Figure 3:
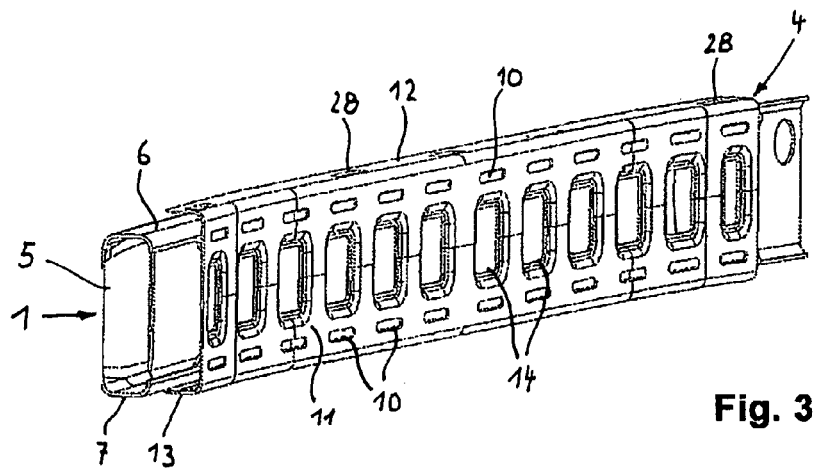
FIG. 3 is a rear perspective illustration of the cross member of the bumper, without illustration of a buffer on a front side of the cross member.

The mounting plate 4 is also configured of U shape, defined by a central longitudinal wall 11 and two flanged portions 12, 13 which extend from the wall 11 in the direction of the shell 3. The wall 11 is formed with recesses or depressions 14 directed towards the crosspiece 5 of the shell 3, as shown in FIG. 3.

The buffer 2 is made as a plastic injection-molded part with a leading elastically yielding buffer portion 15 which has a front face 16 continued on opposite ends by inwardly directed flexible legs 19, 20 via rounded arches 17, 18. The legs 19, 20 are formed in one piece with horizontal spring legs 21, 22 which extend in a direction of the mounting plate 4. The connection between the buffer 2 and the mounting plate 4 is realized by a snap fit, generally designated by reference numeral 23. To implement the snap fit 23, the ends of the spring legs 21, 22 are formed with locking elements in the form of catches 24, 25 which engage undercuts 26, 27 on the mounting plate 4, when the buffer 4 is attached. The undercuts 26, 27 are formed at latch openings 28, 29 in the flanged portions 12, 13 of the mounting plate 4.

Figure 2:
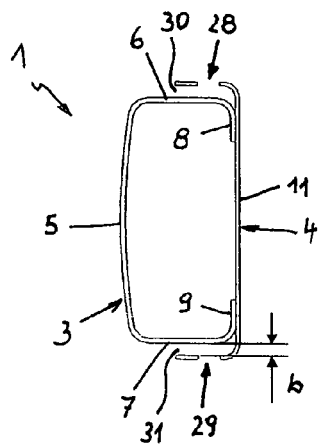
FIG. 2 is a vertical sectional view of a cross member of the bumper of FIG. 1.

As can be seen from FIGS. 1 and 2, passageways 30, 31 are formed between the legs 6, 7 of the shell 3 and the flanged portions 12, 13 of the mounting plate 4 for receiving the spring legs 21, 22 of the buffer 2.

When attaching the buffer 2, the spring legs 21, 22 are pushed or inserted into the passageways 30, 31. As a result of the intrinsic elasticity of the buffer 2, the spring legs 21, 22 with the catches 24, 25 can bend when inserted into the passageways 30, 31 and can deflect radially outwards when entering the latch openings 28, 29 so that the catches 24, 25 engage the undercuts 26, 27 to ensure a stable, yet detachable securement of the buffer 2 to the cross member 1.

As illustrated in FIG. 2, the passageways 30, 31 have a width b which is defined by the dimension of the mounting plate 4. The width b is hereby sized to ensure a desired bias to effect the snap fit 23 and a support of the spring legs 21, 22 of the buffer 2 between the flanged portions 12, 13 of the mounting plate 4 and the legs 6, 7 of the shell 3. As a result, the spring legs 21, 22 are stabilized externally against encountered longitudinal and transversal forces as well as against bending forces.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper for the front or rear section of a motor vehicle, comprising:
    a cross member having a shell of U shaped cross section so as to define two legs interconnected by a crosspiece, and a mounting plate joined to the shell and having a U shaped configuration to define a longitudinal wall and two flanged portions extending from the wall in a direction of the shell so that passageways are formed between the legs of the shell and the flanged portions of the mounting plate; and
    a buffer disposed anteriorly of the cross member and constructed for a snap fit to the mounting plate, said buffer having spring legs for acceptance in the passageways, wherein the buffer includes catches for engagement in undercuts of the mounting plate to implement the snap fit, when the buffer is installed.

2. The bumper of claim 1, wherein the undercuts are formed at latch openings of the mounting plate.

3. The bumper of claim 2, wherein the latch openings are provided in the flanged portions.

4. A bumper for the front or rear section of a motor vehicle, comprising:
    a cross member having a shell of U shaped cross section so as to define two legs interconnected by a crosspiece, and a mounting plate joined to the shell and having a U shaped configuration to define a longitudinal wall and two flanged portions extending from the wall in a direction of the shell so the passageways are formed between the legs of the shell and the flanged portions of the mounting plate; and
    a buffer disposed anteriorly of the cross member and constructed for a snap fit to the mounting plate, said buffer having spring legs for acceptance in the passageways, wherein the legs of the shell have ends respectively extended by flanges, with the mounting plate being joined to the flanges of the shell, wherein the flanges of the legs point inwardly toward one another.

5. A bumper for the front or rear section of a motor vehicle, comprising:
    a cross member having a shell of U shaped cross section so as to define two legs interconnected by a crosspiece, and a mounting plate joined to the shell and having a U shaped configuration to define a longitudinal wall and two flanged portions extending from the wall in a direction of the shell so that passageways are formed between the legs of the shell and the flanged portions of the mounting plate; and
    a buffer disposed anteriorly of the cross member and constructed for a snap fit to the mounting plate, said buffer having spring legs for acceptance in the passageways, wherein the cross member is made of steel sheet and the buffer is made of plastic.

* * * * *